US010818886B1

(12) United States Patent
Chen (10) Patent No.: US 10,818,886 B1
(45) Date of Patent: Oct. 27, 2020

(54) SECONDARY BATTERY

(71) Applicant: Contemporary Amperex Technology Co., Limited, Ningde, Fujian (CN)

(72) Inventor: Baisong Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/559,643

(22) Filed: Sep. 4, 2019

(30) Foreign Application Priority Data

May 13, 2019 (CN) ...................... 2019 2 0680459 U (51) Int. Cl.
*H01M 2/04* (2006.01)
*H01M 2/06* (2006.01)

(52) U.S. Cl.
CPC ............. *H01M 2/043* (2013.01); *H01M 2/06* (2013.01); *H01M 2220/20* (2013.01)

(58) Field of Classification Search
CPC ..... H01M 2/043; H01M 2/06; H01M 2220/20
See application file for complete search history.

(56) References Cited

U.S. PATENT DOCUMENTS

| 2019/0067649 | A1* | 2/2019 | Li | H01M 2/0426 |
| 2019/0067650 | A1* | 2/2019 | Li | H01M 2/0473 |
| 2019/0067663 | A1* | 2/2019 | Li | H01M 10/425 |
| 2019/0067664 | A1 | 2/2019 | Kwak | |

FOREIGN PATENT DOCUMENTS

| CN | 207233789 U | 4/2018 |
| CN | 108428824 A | 8/2018 |
| CN | 109428017 A | 3/2019 |
| CN | 208690318 U | 4/2019 |
| CN | 208819925 U | 5/2019 |
| CN | 209766578 U | 12/2019 |
| EP | 2453501 A1 | 5/2012 |
| EP | 3451409 A1 | 3/2019 |
| EP | 3451410 A1 | 3/2019 |
| JP | 2011216402 A | 10/2011 |

OTHER PUBLICATIONS

PCT International Search Report for PCT/CN2020/084445, dated Jun. 29, 2020, 20 pages.
The extended European search report dated Mar. 13, 2020 for European Application No. 19195565.7, 7 pages.

* cited by examiner

*Primary Examiner* — Stewart A Fraser
(74) *Attorney, Agent, or Firm* — Law Offices of Liaoteng Wang (57) ABSTRACT

The present disclosure relates to a secondary battery. The secondary battery includes a cap assembly including a cap plate provided with an electrode lead-out hole, an electrode terminal covering the electrode lead-out hole, a sealing ring disposed between the cap plate and the electrode terminal, and a lower insulating member including a base portion and a protruding portion connected to each other, wherein the base portion is located at a lower side of the cap plate and the protruding portion is at least partially located in the electrode lead-out hole; a current collecting member including a body portion and an extending portion connected to each other, wherein the body portion is located below the base portion, and the extending portion extends into the electrode lead-out hole and is connected to the electrode terminal; and a support member disposed between the body portion and the base portion.

16 Claims, 7 Drawing Sheets

SECONDARY BATTERY

CROSS REFERENCE TO RELATED APPLICATION

This application claims priority to Chinese Patent Application No. 201920680459.9, filed on May 13, 2019, which is hereby incorporated by reference in its entirety.

TECHNICAL FIELD

The present disclosure relates to a technical filed of secondary battery, and particularly relates to a secondary battery.

BACKGROUND

Lithium ion secondary batteries have been widely used in the fields of hybrid vehicles and electric vehicles due to the advantages thereof, such as high energy, high capacity and high power. A secondary battery includes a cap plate, electrode terminals disposed on one side of the cap plate, a lower insulating member connected to the cap plate, and a current collecting member connected to the electrode terminal. In the prior art, there is a gap between a portion of the current collecting member located below the lower insulating member and the lower insulating member, and thus, there is a risk that the lower insulating member moves downward from its initial position, which affects safety of use of the secondary battery.

SUMMARY

The embodiments of the present disclosure provide a secondary battery which can limit the lower insulating member via a support member, and effectively prevent the lower insulating member from moving downward.

The embodiments of the present disclosure provide a secondary battery which comprises: a cap assembly comprising a cap plate provided with an electrode lead-out hole, an electrode terminal adapted to cover the electrode lead-out hole, a sealing ring disposed between the cap plate and the electrode terminal, and a lower insulating member comprising a base portion and a protruding portion connected to each other, wherein the base portion is located at a lower side of the cap plate and has a thickness of 0.01 mm to 10 cm, and the protruding portion is at least partially located in the electrode lead-out hole; a current collecting member comprising a body portion and an extending portion connected to each other, wherein the body portion is located below the base portion of the lower insulating member, and the extending portion extends into the electrode lead-out hole and is connected to the electrode terminal; and a support member disposed between the body portion of the current collecting member and the base portion of the lower insulating member.

According to one aspect of the embodiments of the present disclosure, the support member is spaced apart from the extending portion of the current collecting member in a radial direction of the electrode lead-out hole, and/or a periphery of the body portion of the current collecting member away from the extending portion extends beyond a periphery of the support member away from the extending portion in the radial direction of the electrode lead-out hole.

According to one aspect of the embodiments of the present disclosure, the secondary battery further comprises an electrode assembly comprising a tab, wherein the tab and the body portion of the current collecting member are connected to each other, forming a connection region between them; and, the support member is spaced apart from the connection region in a radial direction of the electrode lead-out hole.

According to one aspect of the embodiments of the present disclosure, the body portion of the current collecting member comprises a fusing portion, and the secondary battery further comprises a plastic member covering the fusing portion; and, a portion of the plastic member located between the body portion and the base portion of the lower insulating member has a thickness less than or equal to that of the support member in an axial direction of the electrode lead-out hole.

According to one aspect of the embodiments of the present disclosure, the body portion of the current collecting member is provided with a receiving portion on a side facing away from the cap plate and the tab is received in the receiving portion and connected to the body portion.

According to one aspect of the embodiments of the present disclosure, the support member is formed integrally with the body portion of the current collecting member, or is formed integrally with the base portion of the lower insulating member.

According to one aspect of the embodiments of the present disclosure, the support member is formed individually from the body portion of the current collecting member, or the base portion of the lower insulating member.

According to one aspect of the embodiments of the present disclosure, the support member is formed as an elastic member and has a thickness in a free state greater than or equal to a distance between the body portion of the current collecting member and the base portion of the lower insulating member in an axial direction of the electrode lead-out hole.

According to one aspect of the embodiments of the present disclosure, the support member has a rigidity smaller than that of the sealing ring.

According to one aspect of the embodiments of the present disclosure, the sealing ring is at least partially located between the protruding portion of the lower insulating member and the electrode terminal, projections of the sealing ring, the protruding portion and the support member obtained with projection lines in an axial direction of electrode lead-out hole are at least partially overlapped, and the protruding portion is connected to the sealing ring in a sealed manner.

According to one aspect of the embodiments of the present disclosure, the protruding portion of the lower insulating member has an inclined surface facing the sealing ring, and the sealing ring is in seal contact with the inclined surface, wherein a portion of the sealing ring located between the inclined surface and the electrode terminal has a compression amount of 5% to 60% in the axial direction of the electrode lead-out hole.

BRIEF DESCRIPTION OF THE DRAWINGS

Features, advantages, and technical effects of exemplary embodiments of the present disclosure will be described below with reference to accompanying drawings.

In the above drawings, the drawings are not drawn to scale.

REFERENCE NUMERALS 10, secondary battery;
11, case;
12, electrode assembly; 121, tab;
13, cap assembly; 131, cap plate; 131a, electrode lead-out hole; 132, electrode terminal; 133, sealing ring; 134, lower insulating member; 134a, base portion; 134b, protruding portion; 134c, through hole; 134d, inclined surface;
14, current collecting member; 141, body portion; 141a, receiving portion; 142, extending portion; 143, plastic member;
15, support member;
X, axial direction; and
Y, radial direction.

DETAILED DESCRIPTION

Below, embodiments of the present disclosure will be further described in detail with reference to the drawings and embodiments. The detailed description of the embodiments and the accompanying drawings are intended to exemplarily illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second" and the like are used for descriptive purposes only and are not to be construed as indicating or implying relative importance.

In the description of the present disclosure, it should be noted that, unless otherwise stated, the terms "installation", "connected, and "coupled" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding the present disclosure, the embodiments of the present disclosure will be described in detail below by reference to FIG. 1 to FIG. 9.

Figure 1:
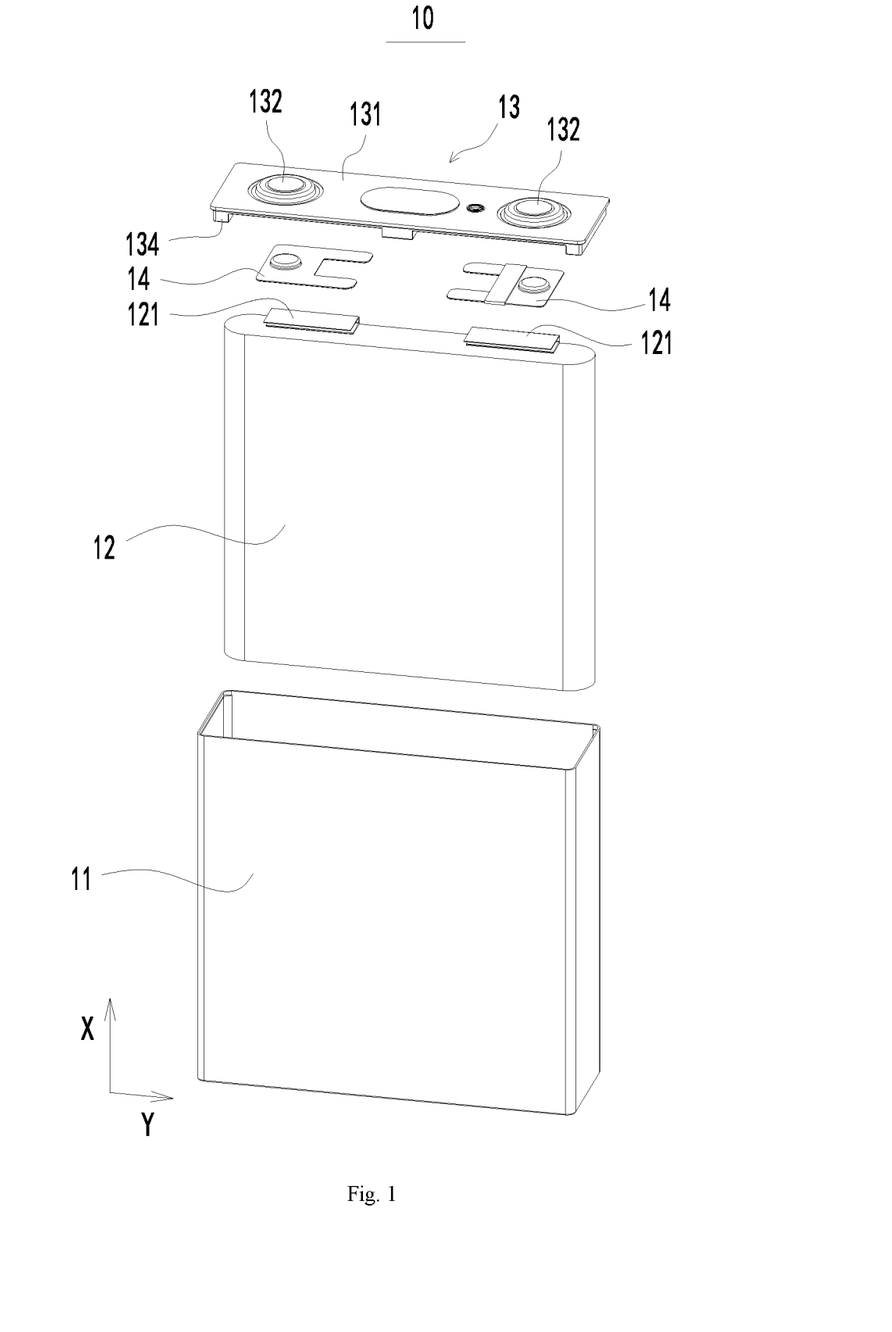
FIG. 1 is a schematic exploded view of a secondary battery according to an embodiment of the present disclosure.

Referring to FIG. 1, a secondary battery 10 according to an embodiment of the present disclosure includes a case 11, an electrode assembly 12 disposed within the case 11, and a cap assembly 13 that is connected to the case 11 in a sealed manner.

The case 11 of the present embodiment is formed in a shape of square having five faces or in other shapes. The case 11 has an internal space in which the electrode assembly 12 and the electrolyte are accommodated. The case 11 can be made of a material such as aluminum, aluminum alloy, and plastic.

The electrode assembly 12 of the present embodiment has a main body formed by spirally winding a first electrode plate, a second electrode plate and a separator together around a winding axis, wherein the separator is an insulating member interposed between the first electrode plate and the second electrode plate. The electrode assembly 12 of the present embodiment as a whole is formed in a flat shape, and has a predetermined thickness, height, and width. In the present embodiment, the description is made by exemplarily taking the first electrode plate as a positive electrode plate, and taking the second electrode plate as a negative electrode plate. Similarly, in other embodiments, the first electrode plate may be a negative electrode plate, and the second electrode plate is a positive electrode plate. Further, active material of the positive electrode plate is coated on a coating portion of the positive electrode plate, and active material of the negative electrode plate is coated on a coating portion of the negative electrode plate. The uncoated region extending from the coated portion of the main body serves as a tab 121. The electrode assembly 12 includes two tabs 121, namely a positive tab and a negative tab, wherein the positive tab extends outwards from the coated region of the positive electrode plate, and the negative tab extends outwards from the coated region of the negative electrode plate.

Figure 2:
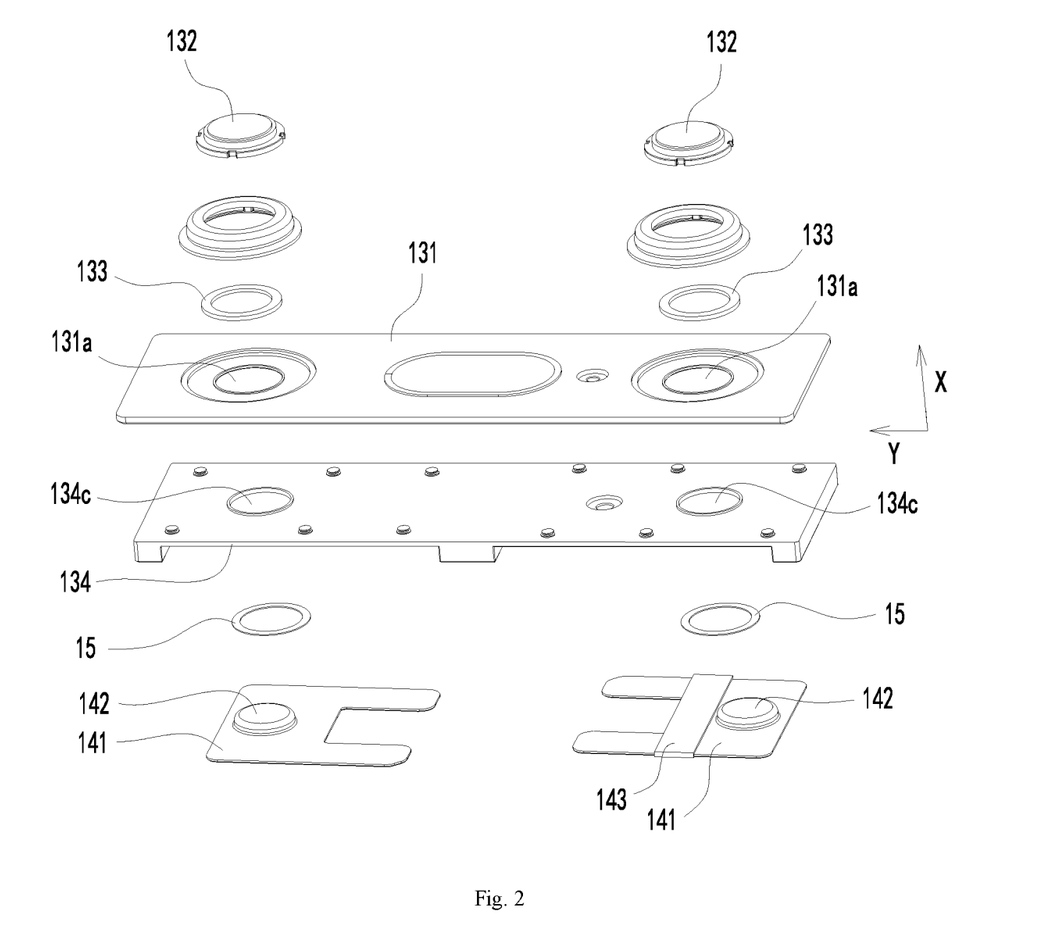
FIG. 2 is a schematic partial exploded view of a secondary battery according to an embodiment of the present disclosure.

Referring to FIG. 2, the cap assembly 13 according to the embodiment of the present disclosure includes a cap plate 131, an electrode terminal 132, a sealing ring 133 and a lower insulating member 134. The cap plate 131 is connected to the case 11 in a sealed manner to enclose the electrode assembly 12 within the case 11. The cap assembly 131 has an electrode lead-out hole 131a, and the electrode terminal 132 covers the electrode lead-out hole 131a. The electrode terminal 132 is connected to the cap plate 131. The sealing ring 133 is disposed between the cap plate 131 and the electrode terminal 132, and a sealing connection between the electrode terminal 132 and the cap plate 131 is formed via the sealing ring 133. The sealing ring 133 is disposed with its central hole corresponding to the electrode lead-out hole 131a. The lower insulating member 134 has a base portion 134a and a protruding portion 134b. The base portion 134a and the protruding portion 134b are connected to each other. The base portion 134a and the electrode terminal 132 are respectively disposed on two opposite sides of the cap plate 131 in an axial direction X of the electrode lead-out hole 131a, wherein the base portion 134a is located on a lower side of the cap plate 131, and the electrode terminal 132 is located on an upper side of the cap plate 131. In one embodiment, the base portion 134a has a thickness of 0.01 mm to 10 cm. The thickness of the base portion 134a is a value measured in the axial direction X of the electrode lead-out hole 131a. If the thickness of the base portion 134a is less than 0.01 mm, the base portion 134a has a relatively small rigidity, and thus is easy to be damaged in structure when subjected to an external force, which may cause an insulation failure. Meanwhile, the base portion 134a with a small thickness has a poor insulation property, and thus may be broken down when a too high voltage is applied to the cap plate 131 and a body portion of the current collecting member. If the thickness of the base portion 134a is larger than 10 cm, the thickness of the base portion 134a is too large such that the base portion 134a will occupy too much installation space inside the secondary battery 10, which will lower energy density of the secondary battery 10. The protruding portion 134b of the lower insulating member 134 is at least partially located in the electrode lead-out hole 131a. In one embodiment, the protruding portion 134b are in contact with the sealing ring 133 to achieve sealing connection between the both.

Figure 3:
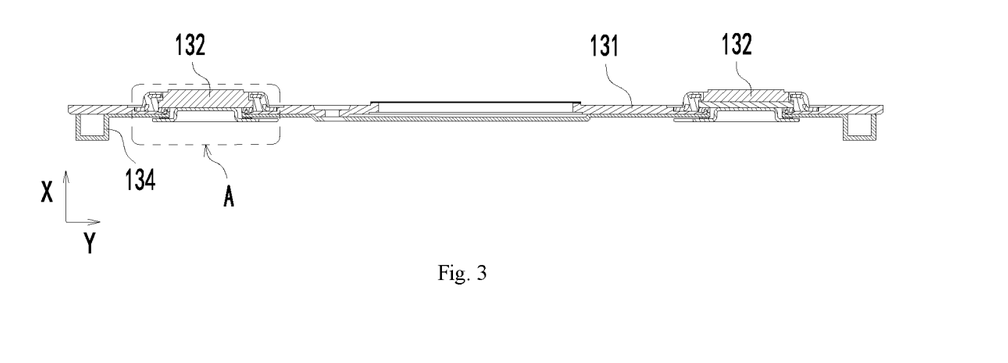
FIG. 3 is a schematic partial cross-sectional view of a secondary battery according to an embodiment of the present disclosure.
Figure 4:
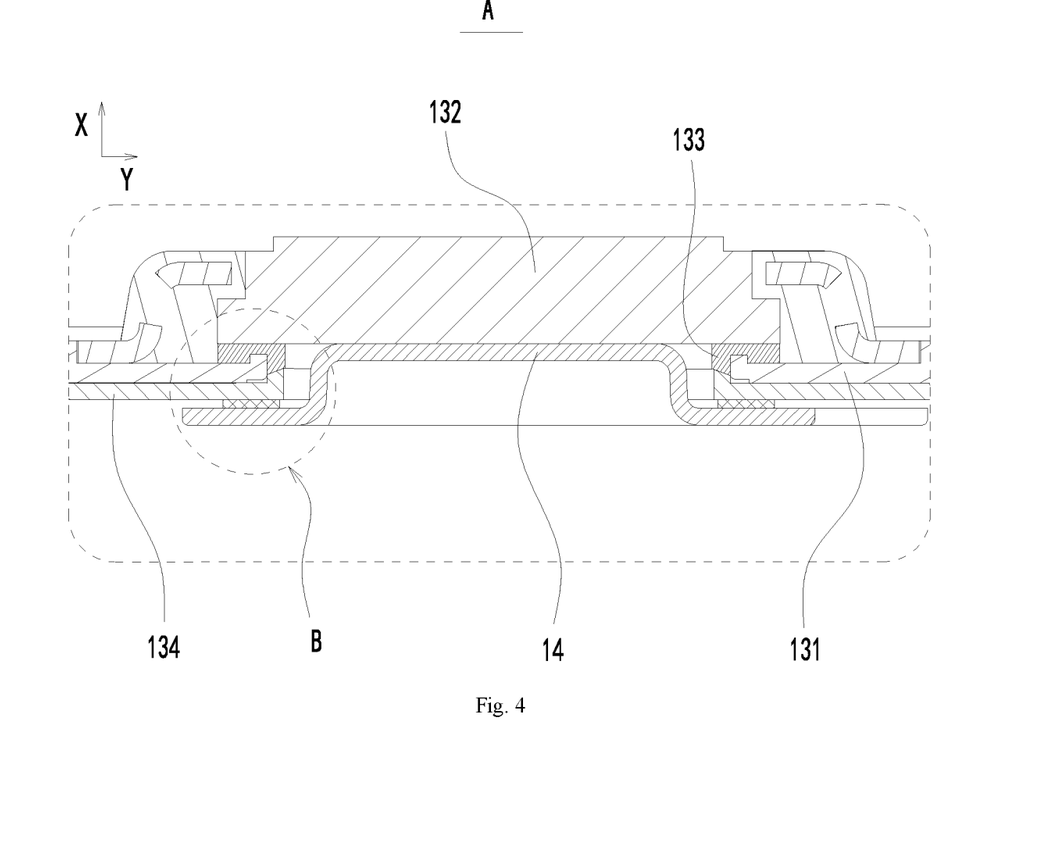
FIG. 4 is an enlarged view of part A in FIG. 3.

Referring to FIG. 2 to FIG. 4, the secondary battery 10 according to the embodiment of the present disclosure further includes a current collecting member 14. The current collecting member 14 has a body portion 141 and an extending portion 142 which are connected to each other, wherein the body portion 141 is located below the base portion 134a, and the extending portion 142 projects into the electrode lead-out hole 131a and is connected to the electrode terminal 132. The electrode terminal 132 is coupled to the tab 121 of the electrode assembly 12 via the current collecting member 14.

In one embodiment, as shown in FIG. 2, the lower insulating member 134 has a through hole 134c extending in the axial direction X of the electrode lead-out hole 131a. The through hole 134c is formed corresponding to the electrode lead-out hole 131a. The extending portion 142 of the current collecting member 14 passes through the through hole 134c, projects into the electrode lead-out hole 131a, and then is connected to the electrode terminal 132. The through hole 134c penetrates through the base portion 134a and the protruding portion 134b.

Figure 5:
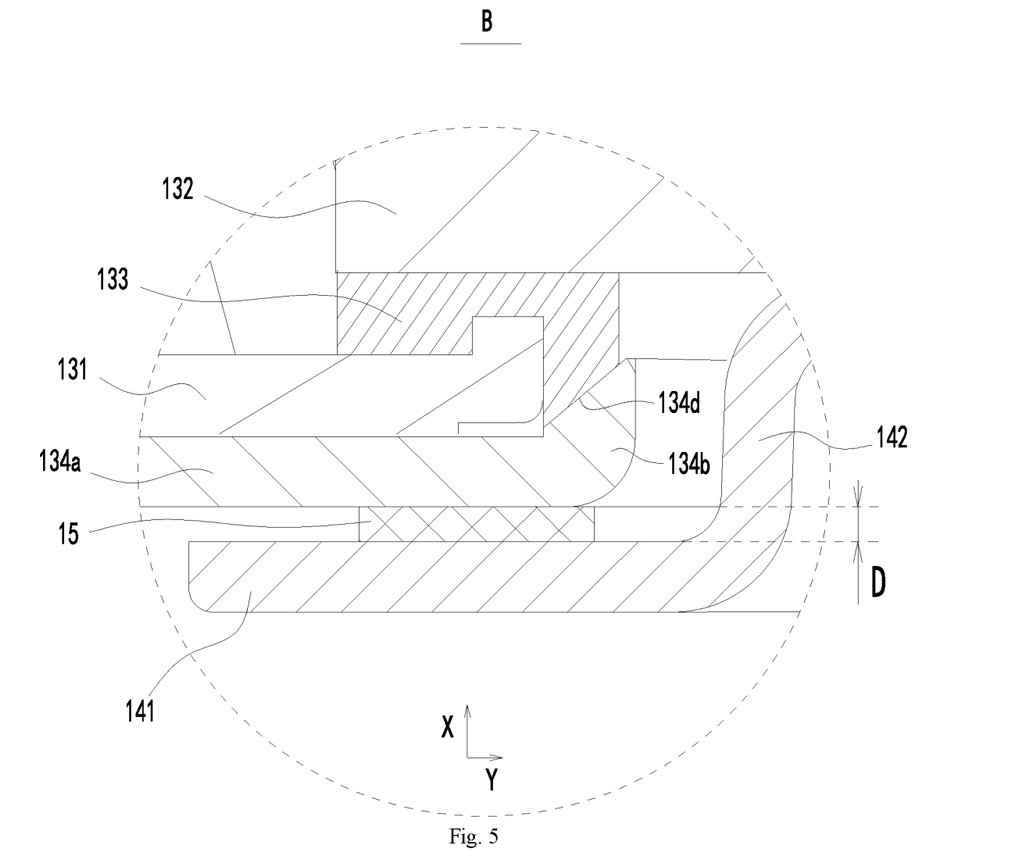
FIG. 5 is an enlarged view of part B in FIG. 4.

Referring to FIG. 5, the secondary battery 10 according to the embodiment of the present disclosure further includes a support member 15. The support member 15 is disposed between the body portion 141 of the current collecting member 14 and the base portion 134a of the lower insulating member 134. After the current collecting member 14 is connected and fixed to the electrode terminal 132, the support member 15 can compensate for a gap between the body portion 141 and the base portion 134a. When the lower insulating member 134 tends to move downward or has moved downward in the axial direction X, the support member 15 can support and limit the lower insulating member 134, thereby preventing the lower insulating member 134 from moving downward and deviating from an initial position.

The secondary battery 10 according to the embodiment of the present disclosure includes a cap assembly 13, a current collecting member 14, and a support member 15. Since the support member 15 is disposed between the body portion 141 of the current collecting member 14 and the base portion 134a of the lower insulating member 134, the support member 15 can limit the base portion 134a, and thus can limit the entire lower insulating member 134, which can effectively prevent the lower insulating member 134 from moving downward in the axial direction X and deviating from the initial position, thereby improving the safety of use of the secondary battery 10.

In one embodiment, the support member 15 is spaced apart from the extending portion 142 of the current collecting member 14 in a radial direction Y of the electrode lead-out hole 131a. A recess is formed between the support member 15 and the extending portion 142 such that there is no positional interference between the support member 15 and the extending portion 142.

In one embodiment, a periphery of the body portion 141 of the current collecting member 14 away from the extending portion 142 extends beyond a periphery of the support member 15 away from the extending portion 142 in the radial direction Y of the electrode lead-out hole 131a, such that a step-like configuration is formed by the body portion 141 and the support member 15. The body portion 141 can support the entire support member 15 to provide a supporting force for the entire support member 15, thereby providing a supporting force for the lower insulating member 134 via the entire support member 15.

In one embodiment, in the radial direction Y of the electrode lead-out hole 131a, the support member 15 is spaced apart from the extending portion 142, and a periphery of the body portion 141 away from the extending portion 142 extends beyond a periphery of the support member 15 away from the extending portion 142. In the radial direction Y of the electrode lead-out hole 131a, a recess is formed between the support member 15 and the extending portion 142. A step-like configuration is formed by the body portion 141 and the support member 15.

In one embodiment, the support member 15 is formed in an annular shape. The support member 15 extends in a circumferential direction of the extending portion 142 and is disposed surrounding the extending portion 142.

Figure 6:
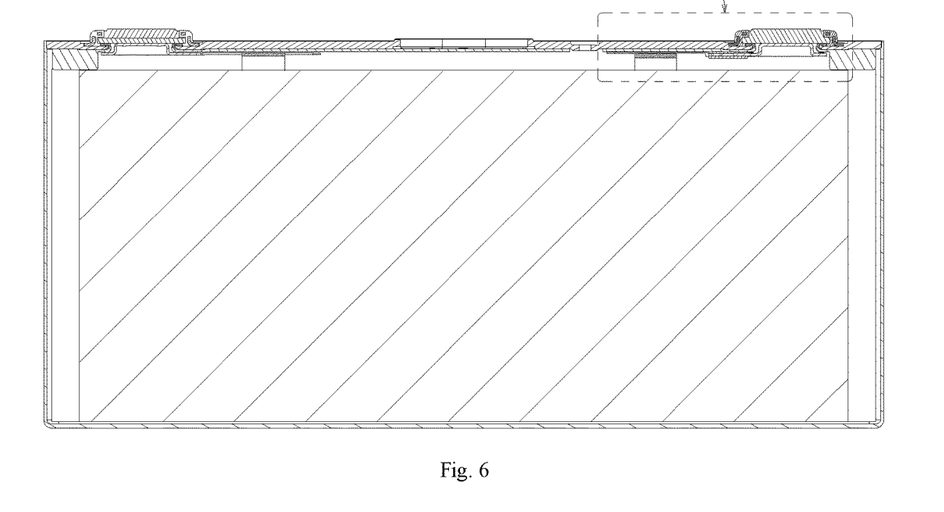
FIG. 6 is a schematic cross-sectional view of a secondary battery according to an embodiment of the present disclosure.
Figure 7:
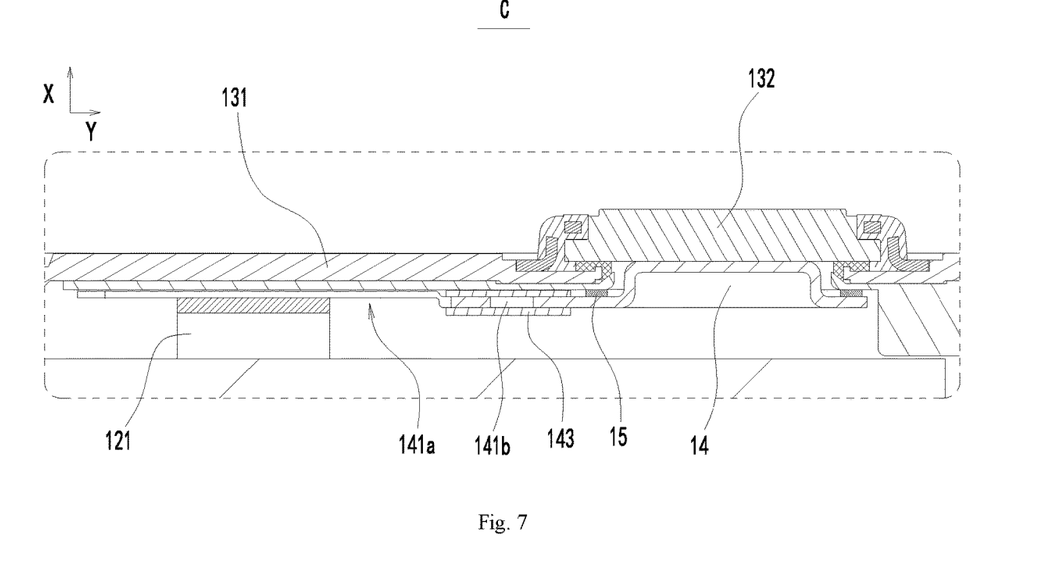
FIG. 7 is an enlarged view of part C in FIG. 6.

In one embodiment, referring to FIG. 6 and FIG. 7, the tab 121 of the electrode assembly 12 is connected to the body portion 141 of the current collecting member 14. A connection region is formed between the body portion 141 and the tab 121, and the support member 15 is spaced apart from the connection region in the radial direction Y of the electrode lead-out hole 131a. The support member 15 is located outside the connection region, that is, projections of the support member 15 and the connection region obtained with projection lines in the axial direction X of the electrode extraction hole 131a are not overlapped with each other. During use of the secondary battery 10, a large amount of heat is generated in the connection region between the tab 121 and the body portion 141, resulting in a high temperature in the connection region. The manner in which the support member 15 is spaced apart from the connection region, can effectively prevent the heat of the connection region from being transmitted to the support member 15 and the corresponding temperature increase of the support member 15, thereby being conducive to reducing a possibility of damaging the support member 15 in structure due to the heat and thus improving lifetime of the support member 15. In one example, the connection region between the body portion 141 and the tab 121 is formed by welding.

In one embodiment, as shown in FIG. 2 and FIG. 7, the body portion 141 has a fusing portion 141b. When an abnormality occurs during use of the secondary battery 10, the fusing portion 141b can be blown out, thereby breaking the connection between the tab 121 and the electrode terminal 132. In one example, the body portion 141 has a hole (which is shown in FIG. 7 while cannot be seen in FIG. 2), for example, an elongated hole, and a part of the body portion 141 corresponding to the hole forms a fusing portion 141b having a small current flow area. The secondary battery 10 further includes a plastic member 143, and the fusing portion 141b is covered by the plastic member 143. The support member 15 is disposed with its upper surface in contact with the base portion 134a and with its lower surface in contact with the body portion 141 in the axial direction X of the electrode lead-out hole 131a. In one example, a portion of the plastic member 143 located between the body portion 141 and the base portion 134a has a thickness less than or equal to that of the support member 15 in the axial direction X of the electrode lead-out hole 131a, thereby reducing a possibility that the support member 15 cannot contact with the base portion 134a due to a contact of the plastic member 143 with the base portion 134a caused by a too great thickness of the plastic member 143.

In one embodiment, as shown in FIG. 7, the body portion 141 is provided with a receiving portion 141a on a side facing away from the cap plate 131. The tab 121 is received in the receiving portion 141a and connected to the body portion 141, thereby being conducive to improving a structural compactness of the tab 121 and the body portion 141 in the axial direction X of the electrode lead-out hole 131a, and further conducive to improving the energy density of the secondary battery 10. In one example, a portion of the body portion 141 is configured to protrude towards the lower insulating member 134 to form the above-described receiving portion 141a. A portion of the tab 121 located below the body portion 141 and protruding into the receiving portion 141a is connected to the body portion 141.

In one embodiment, referring to FIG. 4 and FIG. 5, the support member 15 is formed individually from the body portion 141 or the base portion 134a. The support member 15 can be an independent member. Alternatively, the support member 15 is connected to the body portion 141, or the base portion 134a by bonding.

In one example, referring to FIG. 5, the support member 15 is formed as an elastic member. The support member 15 has a thickness in a free state greater than or equal to a distance D between the body portion 141 and the base portion 134a in the axial direction X of the electrode lead-out hole 131a. In the embodiment in which the thickness of the support member 15 in the free state is greater than the distance D between the body portion 141 and the base portion 134a, after the extending portion 142 of the current collecting member 14 and the electrode terminal 132 are connected and fixed to each other, the body portion 141 of the current collecting member 14 and the base portion 134a of the lower insulating member 134 will press the support member 15 together, so that the support member 15 will compress to absorb compressive forces from the body portion 141 and the base portion 134a. Thus, on the one hand, the support member 15 can closely contact with the lower insulating member 134 under an elastic restoring force, thereby providing an effective support for the lower insulating member 134, and the elastic restoring force of the support member 15 can act on the lower insulating member 134, thereby effectively preventing the lower insulating member 134 from moving downward; on the other hand, during the connection of the extending portion 142 of the current collecting member 14 and the electrode terminal 132, the supporting member 15 can be compressed by the body portion 141 of the current collecting member 14 and will not interfere with the body portion 141, thereby ensuring that the extending portion 142 can closely contact with the electrode terminal 132, which is conducive to improving reliability of the welding connection between the extending portion 142 and the electrode terminal 132, and reducing a possibility that a false welding occurs due to a poor contact between the extending portion 142 and the electrode terminal 132 caused by the interference of the support member 15 to the body portion 141 of the current collecting member 14. In the embodiment in which the thickness of the support member 15 in the free state is equal to the distance D between the body portion 141 and the base portion 134a, after the extending portion 142 of the current collecting member 14 and the electrode terminal 132 are connected and fixedly to each other, each of the body portion 141 and the base portion 134a can contact with the support member 15, but neither the body portion 141 nor the base portion 134a applies compressive force to the support member 15. Thus, on the one hand, when the lower insulating member 134 moves downward, the support member 15 can be compressed by the lower insulating member 134 and thus can accumulate an elastic restoring force, which can reversely act on the lower insulating member 134 and push it back to its initial position. On the other hand, during the connection of the extending portion 142 of the current collecting member 14 and the electrode terminal 132, the body portion 141 can contact with the support member 15 without applying a compressive force to the support member 15, and thus the support member 15 will not interfere with the body portion 141, thereby ensuring that the extending portion 142 and the electrode terminal 132 can closely contact with each other, which is conducive to improving reliability of the welding connection between the extending portion 142 and the electrode terminal 132, and reducing a possibility that a false welding occurs due to a poor contact between the extending portion 142 and the electrode terminal 132 caused by the interference of the support member 15 to the body portion 141 of the current collecting member 14. Further, the support member 15 has a rigidity smaller than that of the sealing ring 133. The support member 15 has a deform capability higher than the sealing ring 133. In the case that the support member 15 and the sealing ring 133 are subjected to external forces of the same amount and direction, the support member 15 is more easily deformed with respect to the sealing ring 133. Thus, when connecting and fixing the extending portion 142 of the current collecting member 14 to the electrode terminal 132, the body portion 141 of the current collecting member 14 can press the support member 15 and deform it, thereby reducing a possibility that the extending portion 142 and the electrode terminal 132 cannot maintain a good contact easily due to the interference of the support member 15 to the body portion 141, facilitating to reduce a force acting on a connection region between the extending portion 142 and the electrode terminal 132 and tending to separate the extending portion 142 and the electrode terminal 132, and improving reliability and stability of the connection between the extending portion 142 and the electrode terminal 132.

Optionally, the support 15 is formed as a spring. The spring has a stiffness coefficient smaller than a product of an elastic modulus and a cross-sectional area of the sealing ring 133 (here, the cross-sectional area refers to a cross-sectional area of a portion of the sealing ring 133 located between the protruding portion 134b and the electrode terminal 132), making the rigidity of the support member 15 smaller than that of the sealing ring 133. Alternatively, the support member 15 is made of rubber, the sealing ring 133 is made of rubber, and the support member 15 has a hardness smaller than that of the sealing ring 133, so that the rigidity of the support member 15 is smaller than that of the sealing ring 133. In one example, the support 15 is formed in an annular shape. The extending portion 142 of the current collecting member 14 passes through a central hole of the support member 15.

Figure 8:
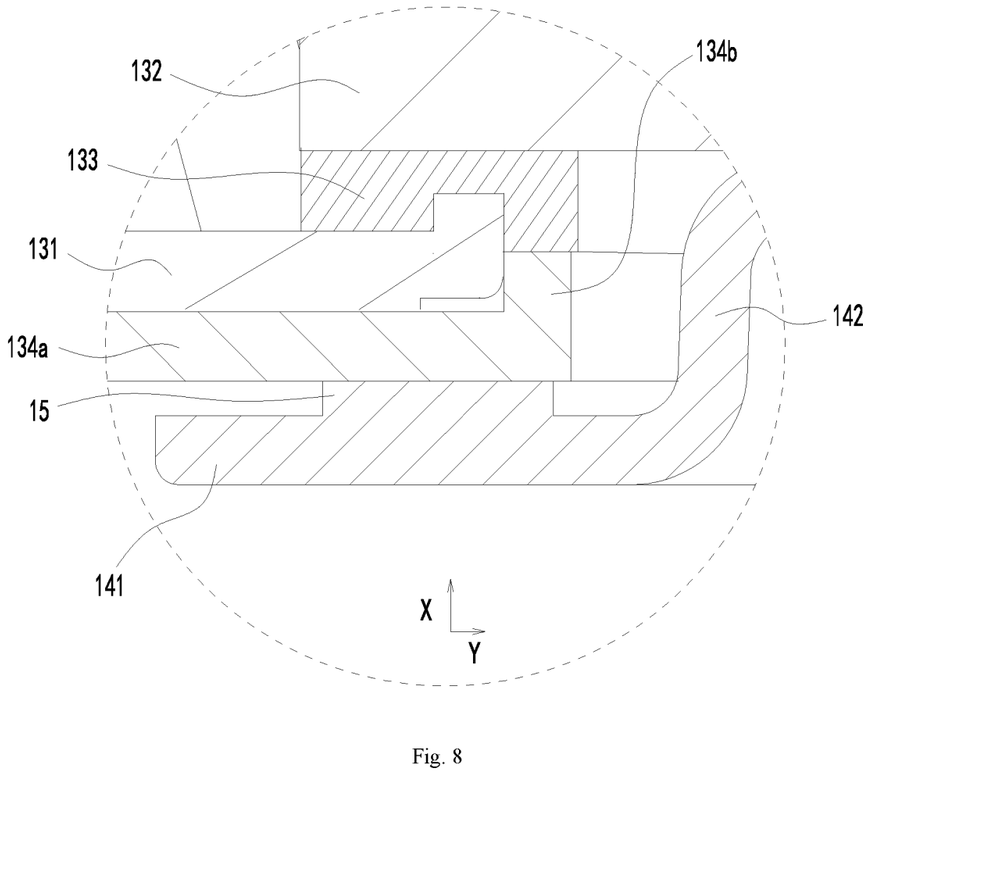
FIG. 8 is a schematic partial cross-sectional view of a secondary battery according to a further embodiment of the present disclosure.

In one embodiment, referring to FIG. 8, the support member 15 is formed integrally with the body portion 141. The support member 15 and the body portion 141 can be simultaneously formed and manufactured, which can reduce the number of processing steps and thus can reduce processing cost. Meanwhile, a connection strength is high when the support member 15 is integrally connected to the body portion 141, and thus the support member 15 will not displace relative to the body portion 141.

Figure 9:
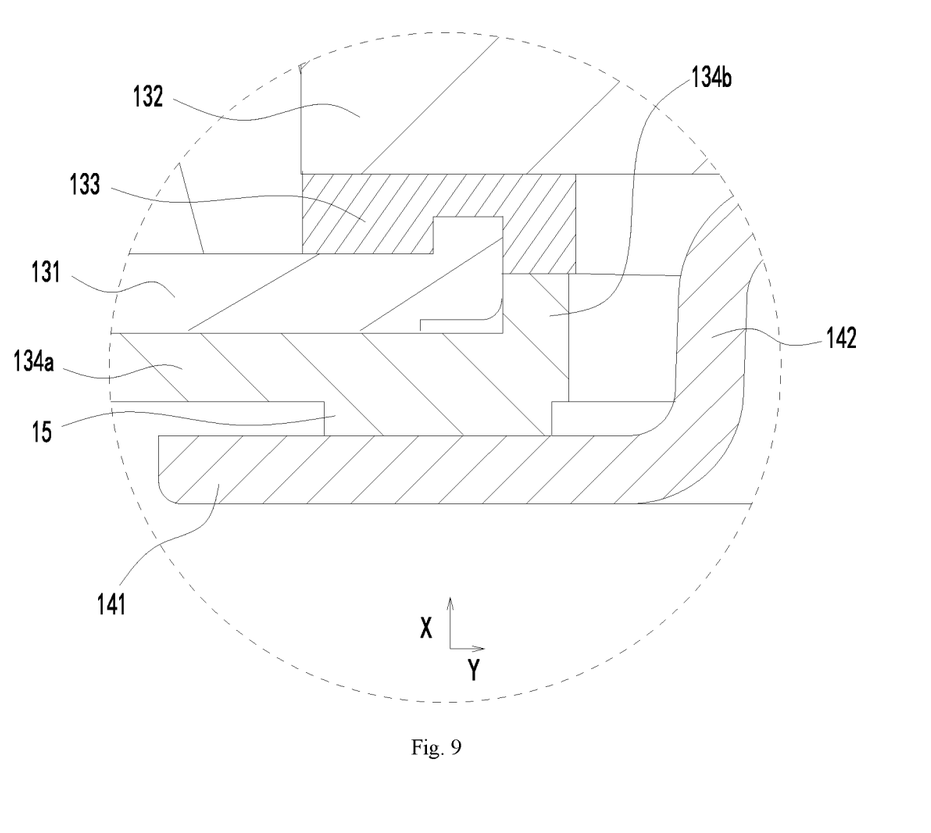
FIG. 9 is a schematic partial cross-sectional view of a secondary battery according to a further embodiment of the present disclosure.

In one embodiment, referring to FIG. 9, the support member 15 is formed integrally with the base portion 134*a*. The support member 15 and the base portion 134*a* can be simultaneously formed and manufactured, which can reduce the number of processing steps and thus can reduce processing cost. In one example, the support member 15 and the base portion 134*a* may be fabricated by an integral injection molding process. Meanwhile, a connection strength is high when the support member 15 is integrally connected to the base portion 134*a*, and thus the support member 15 will not displace relative to the base portion 134*a*.

It shall be understood that, the support member 15 being formed integrally with the body portion 141 or the base portion 134*a* is also applicable to the embodiment as shown in FIGS. 6 and 7.

In one embodiment, referring to FIG. 5, the sealing ring 133 is at least partially located between the protruding portion 134*b* and the electrode terminal 132. Projections of the sealing ring 133, the protruding portion 134*b* and the support member 15 obtained with projection lines in the axial direction X of the electrode lead-out hole 131*a*, are at least partially overlapped. After being connected to the electrode terminal 132, the current collecting member 14 can provide a supporting force in the axial direction X to the lower insulating member 134 via the support member 15, and then provide a supporting force to the sealing ring 133 via the lower insulating member 134. As a result, the protruding portion 134*b* of the lower insulating member 134 and the electrode terminal 132 can press the portion of the sealing ring 133 located between the protruding portion 134*b* and the electrode terminal 132 together. In one example, the protruding portion 134*b* is connected with the sealing ring 133 in a sealed manner to form a sealing interface between the protruding portion 134*b* and the sealing ring 133. Since the lower insulating member 134 can be prevented from moving downward by the support member 15, it is not easy for a gap between the protruding portion 134*b* of the lower insulating member 134 and the sealing ring 133 to appear, thereby ensuring a good seal between the protruding portion 134*b* and the sealing ring 133. As such, on the one hand, a possibility of occurrence of a direct electrical clearance between the cap plate 131 and the electrode terminal 132 or between the cap plate 131 and the extending portion 142 of the current collecting member 14 can be reduced, and a risk of breakdown between the cap plate 131 and the electrode terminal 132, and between the cap plate 131 and the extending portion 142 of the current collecting member 14 can be reduced. On the other hand, since the electrolyte cannot enter the sealing interface formed between the protruding portion 134*b* and the sealing ring 133, a possibility that an electric resistance between the cap plate 131 and the electrode terminal 132 becomes smaller due to an accumulation of too much electrolyte between the protruding portion 134*b* and the sealing ring 133 can be reduced, and a risk of breakdown between the cap plate 131 and the electrode terminal 132 when the secondary battery 10 is subjected to a high pressure can be further reduced, thereby improving the safety of use of the secondary battery 10.

In one embodiment, the protruding portion 134*b* has an end plane that faces the sealing ring 133. The end plane of the protruding portion 134*b* and the sealing ring 133 are in sealing contact with each other.

In one embodiment, referring to FIG. 5, the protruding portion 134*b* has an inclined surface 134*d* facing the sealing ring 133. The sealing ring 133 is in sealing contact with the inclined surface 134*d*. A portion of the sealing ring 133 located between the inclined surface 134*d* and the electrode terminal 132 has a compression amount of 5% to 60% in the axial direction X of the electrode lead-out hole 131*a*. Here, the compression amount refers to a value obtained by converting a ratio of a total thickness of the compressed portion of the sealing ring 133 in a compressed state to a total thickness of that portion in a free state into a percentage. The protruding portion 134*b* and the sealing ring 133 are interference fit. The protruding portion 134*b* can simultaneously apply a force in the axial direction X and a force in the radial direction Y to the sealing ring 133, making the contact between the protruding portion 134*b* and the sealing ring 133 to be more tight and reliable, which can further improve the sealing reliability of the both, reduce a risk of occurrence of an electric clearance between the protruding portion 134*b* and the sealing ring 133, and meanwhile effectively reduce a possibility of an accumulation of the electrolyte on a creepage path between the protruding portion 134*b* and the sealing ring 133. In one example, the inclined surface 134*d* may face away from or toward the axis of the electrode lead-out hole 131*a*. In the case that the compression amount of the portion of the sealing ring 133 located between the inclined surface 134*d* and the electrode terminal 132 is less than 5%, the portion of the sealing ring 133 located between the inclined surface 134*d* and the electrode terminal 132 has a too small rebound amount, which may be smaller than a displacement amount of the lower insulating member 134 when the lower insulating member 134 moves downward, resulting in that a gap between the protruding portion 134*b* and the sealing ring 133 may appear. If the compression amount of the portion of the sealing ring 133 located between the inclined surface 134*d* and the electrode terminal 132 is more than 60%, the portion of the sealing ring 133 located between the inclined surface 134*d* and the electrode terminal 132 may release a too large elastic restoring force, which can be transmitted to the current collecting member 14 through the protruding portion 134*b* and the supporting member 15 in turn, and finally cause a too large force, which pushes the current collecting member 14 away from the electrode terminal 132, to act on the current collecting member 14, thereby improving a risk that the extending portion 142 of the current collecting member 14 is disconnected from the electrode terminal 132. Preferably, the portion of the sealing ring 133 located between the inclined surface 134*d* and the electrode terminal 132 has a compression amount of 5% to 30%.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A secondary battery, comprising:
a cap plate provided with an electrode lead-out hole;
an electrode terminal, adapted to cover the electrode lead-out hole;

a sealing ring disposed between the cap plate and the electrode terminal; and a lower insulating member comprising a base portion and a protruding portion connected to each other, wherein the base portion is located at a lower side of the cap plate and has a thickness of 0.01 mm to 10 cm, and the protruding portion is at least partially located in the electrode lead-out hole;

a current collecting member comprising a body portion and an extending portion connected to each other, wherein the body portion is located below the base portion, and the extending portion extends into the electrode lead-out hole and is connected to the electrode terminal; and a support member disposed between the body portion and the base portion.

2. The secondary battery of claim 1, wherein the secondary battery has at least one of the following features: (i) the support member is spaced apart from the extending portion in a radial direction of the electrode lead-out hole; and (ii) a periphery of the body portion away from the extending portion extends beyond a periphery of the support member away from the extending portion in the radial direction of the electrode lead-out hole.

3. The secondary battery of claim 2, wherein the secondary battery further comprises an electrode assembly comprising a tab, wherein the tab and the body portion are connected to each other, forming a connection region between them; and, the support member is spaced apart from the connection region in a radial direction of the electrode lead-out hole.

4. The secondary battery of claim 2, wherein the support member is formed integrally with either one of the body portion and the base portion.

5. The secondary battery of claim 1, wherein the secondary battery further comprises an electrode assembly comprising a tab, wherein the tab and the body portion are connected to each other, forming a connection region between them; and, the support member is spaced apart from the connection region in a radial direction of the electrode lead-out hole.

6. The secondary battery of claim 5, wherein the body portion comprises a fusing portion, and the secondary battery further comprises a plastic member covering the fusing portion; and, a portion of the plastic member located between the body portion and the base portion has a thickness less than or equal to that of the support member in an axial direction of the electrode lead-out hole.

7. The secondary battery of claim 5, wherein the body portion is provided with a receiving portion on a side facing away from the cap plate and the tab is received in the receiving portion and connected to the body portion.

8. The secondary battery of claim 5, wherein the support member is formed integrally with either one of the body portion and the base portion.

9. The secondary battery of claim 5, wherein the sealing ring is at least partially located between the protruding portion and the electrode terminal, projections of the sealing ring, the protruding portion and the support member obtained with projection lines in an axial direction of electrode lead-out hole are at least partially overlapped, and the protruding portion is connected to the sealing ring in a sealed manner.

10. The secondary battery of claim 1, wherein the support member is formed integrally with either one of the body portion and the base portion.

11. The secondary battery of claim 10, wherein the sealing ring is at least partially located between the protruding portion and the electrode terminal, projections of the sealing ring, the protruding portion and the support member obtained with projection lines in an axial direction of electrode lead-out hole are at least partially overlapped, and the protruding portion is connected to the sealing ring in a sealed manner.

12. The secondary battery of claim 1, wherein the support member is formed individually from either one of the body portion and the base portion.

13. The secondary battery of claim 12, wherein the support member is formed as an elastic member and has a thickness in a free state greater than or equal to a distance between the body portion and the base portion in an axial direction of the electrode lead-out hole.

14. The secondary battery of claim 13, wherein the support member has a rigidity smaller than that of the sealing ring.

15. The secondary battery of claim 1, wherein the sealing ring is at least partially located between the protruding portion and the electrode terminal, projections of the sealing ring, the protruding portion and the support member obtained with projection lines in an axial direction of electrode lead-out hole are at least partially overlapped, and the protruding portion is connected to the sealing ring in a sealed manner.

16. The secondary battery of claim 15, wherein the protruding portion has an inclined surface facing the sealing ring, and the sealing ring is in sealing contact with the inclined surface, wherein a portion of the sealing ring located between the inclined surface and the electrode terminal has a compression amount of 5% to 60% in the axial direction of the electrode lead-out hole.

* * * * *